United States Patent
Albrecht

(10) Patent No.: US 11,857,999 B2
(45) Date of Patent: Jan. 2, 2024

(54) METHOD FOR MARKING AND HANDLING A COATING MATERIAL

(71) Applicant: HOMAG GmbH, Schopfloch (DE)

(72) Inventor: Ludwig Albrecht, Dornstetten (DE)

( * ) Notice: Subject to any disclaimer, the term of this patent is extended or adjusted under 35 U.S.C. 154(b) by 678 days.

(21) Appl. No.: 16/490,019

(22) PCT Filed: Mar. 13, 2018

(86) PCT No.: PCT/EP2018/056219
§ 371 (c)(1),
(2) Date: Aug. 29, 2019

(87) PCT Pub. No.: WO2018/167049
PCT Pub. Date: Sep. 20, 2018

(65) Prior Publication Data
US 2020/0012262 A1   Jan. 9, 2020

(30) Foreign Application Priority Data

Mar. 15, 2017   (DE) .......................... 102017105504.5

(51) Int. Cl.
*B05D 5/10* (2006.01)
*G06Q 50/04* (2012.01)

(52) U.S. Cl.
CPC ............... *B05D 5/10* (2013.01); *G06Q 50/04* (2013.01)

(58) Field of Classification Search
CPC .. B05D 1/28; B05D 5/10; G06Q 50/04; Y02P 90/30
See application file for complete search history.

(56) References Cited

U.S. PATENT DOCUMENTS

| 2004/0122648 | A1 | 6/2004 | Ando et al. |
| 2006/0196936 | A1 | 9/2006 | Christofferson et al. |
| 2007/0290815 | A1* | 12/2007 | Delis ................. G06Q 10/00 340/572.1 |
| 2008/0239042 | A1* | 10/2008 | Gauss ................. B41J 11/0015 347/101 |
| 2010/0112336 | A1 | 5/2010 | Wang et al. |

FOREIGN PATENT DOCUMENTS

| CN | 102542469 A * | 7/2012 |
| CN | 105136595 A * | 12/2015 |
| DE | 102013004332 A1 | 9/2014 |

(Continued)

OTHER PUBLICATIONS

What is the cloud? | Cloud definition. Webpage [online]. Cloudflare, 2022 [retrieved on Jun. 23, 2022]. Retrieved from the Internet: <https://www.cloudflare.com/learning/cloud/what-is-the-cloud/>. (Year: 2022).*

*Primary Examiner* — William P Fletcher, III
(74) *Attorney, Agent, or Firm* — Morgan, Lewis & Bockius LLP

(57) ABSTRACT

A method for handling a coating material can include the steps of marking the coating material with a mark to identify a first information relating to the coating material, storing the first information relating to the coating material on a cloud-based server, and recording the marker of the coating material, thereby making the first information relating to the coating material accessible via the cloud-based server.

19 Claims, 2 Drawing Sheets

(56) References Cited

FOREIGN PATENT DOCUMENTS

| | | |
|---|---|---|
| DE | 102015106776 A1 | 11/2016 |
| EP | 1125643 A2 | 1/2001 |
| JP | 2007314772 A | 12/2007 |
| WO | WO-2017021556 A1 | 2/2017 |
| WO | WO-2017021558 A1 | 2/2017 |

\* cited by examiner

METHOD FOR MARKING AND HANDLING A COATING MATERIAL

TECHNICAL FIELD

The present invention relates to a method for handling a coating material, in particular a coating material for application to a narrow side of a workpiece, to a use of a coating material, and to a handling device. Such a coating material can be, for example, an edge band that is applied to a narrow side of a workpiece, preferably a workpiece in panel form.

PRIOR ART

Methods for marking workpieces are already known in the prior art. For example, workpieces are printed with a barcode, a corresponding barcode label is applied to a workpiece, or so-called RFID chips are used. Marking methods are further known which permit marking that is not visually discernible.

In the majority of cases, the marking serves to clearly identify the workpiece in the production process. In addition to an identification feature, workpiece features such as, for example, size, colour and material can also be stored on the marking feature carrier. By associating these (identification) features with corresponding routines in the production process, processing of the workpieces can take place in a largely automated manner.

Furthermore, marking allows the origin and processing route of the workpiece to be traced. Thus, in the case of faulty products, both the manufacturer and the affected batch of a workpiece can be properly identified.

In recent years, driven by increased consumer demand for finished products such as furniture, the demand for coating material has increased constantly. However, whereas in the past the manufacturers of coated workpieces predominantly manufactured large quantities of the same workpieces using only a small number of coating material types (thickness, colour, shape, material, etc.) and thus had to have only a small number of different coating materials in stock or in use, an increasing trend towards individualisation, that is to say towards smaller batch sizes with an associated greater batch variety, has been observed in recent years. Accordingly, manufacturers nowadays must order, store and process a soon to be unmanageable number of coating material types, whereby frequently a particular coating material is used for only a very small number of workpieces. Accordingly, the space required for storing the coating material increases considerably, and the handling of the coating material is then also correspondingly complex. Furthermore, it is accordingly often necessary to supply the processing devices in question, in particular the coating machines, with new processing data associated with the particular coating material.

In order to take account of this fact, the prior art proposes not only to provide the marking of the individual workpieces, or bulk goods, such as, for example, coating material, with information for clearly identifying the workpiece, but processing data are additionally stored therewith, in particular stored in an RFID tag, and can be read out on processing of the workpiece, in particular on application of the coating material, and provided to a processing machine for adjusting the processing parameters.

However, owing to the high variance of coating materials nowadays, there is the further problem that it is often not possible for the manufacturers of the coating materials to carry out a sufficient number of tests to provide processing establishments with optimal processing data (process parameters). In many cases, processing establishments also want coating materials that are produced customer-specifically in such a small quantity that separate testing of the optimal processing data does not make financial sense.

OBJECT OF THE INVENTION

Accordingly, the object of the present invention is to provide a method for handling a coating material by means of which it is possible, in a simple manner, to provide an operator of a processing device, in particular of a coating machine, during processing of the coating material, with information relating to the coating material, in particular updated processing data.

The object is achieved by a method according to claim 1, a use according to claim 16, and a handling device according to claim 17. Preferred further developments of the invention are given in the dependent claims.

It is an idea of the present invention to mark a coating material with a marking for identifying first information relating to the coating material, to store the first information relating to the coating material on a cloud-based server and, after detection of the marking of the coating material, to make the first information relating to the coating material accessible via the cloud-based server.

By means of the proposed method it is possible, after detection of the marking of the coating material, to make information relating to the coating material, in particular processing data, accessible via a cloud-based server, in particular to provide that information to an operator of a processing device.

According to the present invention, the method for handling a coating material, in particular a coating material for application to a narrow side of a workpiece, preferably a workpiece in panel form, wherein the workpiece is preferably made at least in part of wood, wood-based materials, wood substitute materials, plastics material or a combination thereof, comprises the steps of:

marking the coating material with a marking for identifying first information relating to the coating material, storing the first information relating to the coating material on a cloud-based server, detecting the marking of the coating material, whereby the first information relating to the coating material becomes accessible via the cloud-based server, wherein the first information made accessible via the cloud-based server is preferably first information that is constantly updated.

In the present invention, the term "cloud-based server" means a server which has a world-wide-web address and creates an internet connectivity by means of which the information stored on the server, which is preferably administered by a database, is made accessible via a remote data transmission. The data stored on the server can thus be accessed over large distances, in particular externally to the establishment. The cloud-based server as it were provides a database in a cloud which individual persons can access in order to share or exchange their data in a cloud-based manner.

According to one embodiment of the present invention, the method further comprises the step of:

storing second information relating to the coating material, in particular processing data, on the cloud-based server, wherein the storing of the second information preferably takes place after the detection of the marking of the coating material and after processing of the coating material.

In this manner, not only is it possible to provide an operator of a processing device, in particular a coating machine, with first information relating to coating material, but the operator is also able to store second information relating to the coating material, which is preferably processing data collected during processing of the coating material, on the cloud-based server.

There is thus created a method, or a system, with which it is possible to create a closed information loop. That is to say, not only to create a flow of information from a manufacturer of the coating material to a processing establishment of the coating material, but also to allow the processing establishment to send information relating to the coating material, in particular to the processing thereof, to the manufacturer of the coating material. In this manner, it is made possible for the manufacturer to collect information, in particular empirical values in respect of the processing data, from the processing establishments.

In a further configuration of the method according to the invention, marking of the coating material takes place during a process of manufacturing the coating material, and detection of the marking of the coating material takes place during processing of the coating material, in particular during a process of coating a workpiece with the coating material.

As already indicated above, marking of the coating material can be carried out by the manufacturer, and detection of the marking, and optionally storing of second information on the cloud-based server, can be carried out by the customer (processing establishment).

It is further preferred if the first information is selected from: an item number, a size, a property, a batch number, a date of manufacture, a use-by date, and/or processing data of the coating material, in particular a melting temperature of an adhesive agent or of the adhesive layer of the coating material.

The second information is preferably selected from: an item number, processing data of the coating material, such as a melting temperature of an adhesive agent or of an adhesive layer of the coating material, a contact pressure, a curing time of the adhesive agent or of the adhesive layer, feedback, a quality assessment of the coating material and the like.

According to a further embodiment of the method according to the invention, after processing of the coating material, via the detection of the marking, processing data, in particular processing data judged to be advantageous, can be stored on the cloud-based server, wherein storing of the processing data preferably takes place in a coating-material-specific manner.

It is thereby possible that, after processing of a coating material, in particular after a series of processing operations using the same coating material, processing data, which are preferably processing data judged to be advantageous, can be stored on the cloud-based server. Thus, if the operator determines, during processing of a particular coating material, that the processing data provided by the manufacturer of the coating material, that is to say first information relating to the coating material, can be optimised, he is able to store the optimised processing data on the cloud-based server in a coating-material-specific manner and thus provide it to the manufacturer.

Accordingly, it is advantageous if the first information relating to the coating material and stored on the cloud-based server can be updated, wherein preferably processing data such as a melting temperature of an adhesive agent or of an adhesive layer of the coating material, a contact pressure, a curing time of the adhesive agent or of the adhesive layer and the like can be updated.

That is to say, if the manufacturer collects new information about the coating material, in particular in the form of the second information stored on the cloud-based server, as a result of feedback from the processing establishments (customers), or if the manufacturer has in the meantime been able to determine improved processing data on the basis of his own tests, it is possible to update the data stored on the server and thus provide the processing establishments with optimised first information, in particular optimised processing data or process parameters.

Furthermore, it is advantageous if, on the basis of a multiplicity of second information stored on the cloud-based server, in particular stored processing data, which can clearly be associated with a specific coating material and/or a specific batch, optimised processing data and/or processing algorithms can be determined.

It is further preferred if the determined optimised processing data and/or processing algorithms can be used further as updated first information and/or can be stored on the cloud-based server as updated first information.

According to a further embodiment of the method according to the invention, it is possible, on the basis of the determined optimised processing data and/or processing algorithms, to carry out automatic updating of processing data and/or processing algorithms stored in processing devices.

In this manner it is possible that, without assistance from the operator, after a new coating material has been loaded into a coating machine and the marking of the coating material has been detected by the coating machine, the cloud-based server is accessed automatically and the most up-to-date coating-material-related information, in particular the most up-to-date processing data and/or processing algorithms, are acquired and the coating machine is configured accordingly.

It is further preferred that, on the basis of a multiplicity of second information stored on the cloud-based server, in particular quality assessments of a specific coating material, conclusions about manufacturing problems on the part of the manufacturer, optimised manufacturing parameters, wear phenomena in the manufacture of the coating material and/or in the processing of the coating material and the like are possible.

The manufacturer of the coating material is thereby in particular given the possibility of extending his quality assurance to processing with the customer. In this manner, quality assurance and monitoring of the quality can be carried out without being dependent on active feedback from the customer, which usually takes place in the form of complaints. This further makes it possible to respond preventively to quality problems which may not yet be perceived as troublesome by the customer and to carry out optimisations of the material itself or the proposed processing data in advance, so that the customer's satisfaction can be ensured and, where necessary, improved.

For that reason it is further preferred that the second information, in particular processing data judged to be advantageous, is automatically stored on the cloud-based server by the processing device, in particular the coating machine.

In this manner it is possible for the manufacturer of the coating material to collect information about the coating material without the assistance of the processing establishment (customer).

It is further preferred that the first information and the second information on the cloud-based server are password-protected, wherein the password is stored in the marking of the coating material.

Furthermore, detection of the marking of the coating material can take place in or at a coating machine, by which coating machine the coating material is being used.

It is likewise preferred that the coating machine comprises a pressing device, in particular a pressing roller, for applying the coating material to a workpiece, preferably a workpiece in panel form, wherein, after detection of the marking of the coating material, the first information is loaded into the control device of the coating machine.

It is further preferred that the control device adjusts and/or activates a tool or a unit of the coating machine on the basis of the first information, wherein in particular a power of an energy source, such as a laser, a microwave source, a hot air source or an infrared source, for activating an adhesive layer of the coating material is adjusted and/or activated.

According to a further embodiment of the method according to the invention, the first information is displayed on a display device of the coating machine or on a mobile device associated with the coating machine, such as a tablet, a laptop, a smartphone, etc.

Furthermore, marking of the coating material can take place by means of a barcode, a 2D character code, a numerical code, a magnetic strip and/or an RFID tag.

It is thereby preferred that the marking of the coating material is provided on or in the coating material.

It is likewise possible that the marking on the coating material is embossed, applied, in particular by adhesive bonding, introduced and/or printed.

Furthermore, the marking can be formed by a fluorescent material attached to the visible side of the coating material.

It is thereby further advantageous to provide the marking on an end portion of the coating material, which end portion is not processed.

In a preferred manner, detection of the marking of the coating material thereby takes place by a barcode reader, an RFID reader and/or an NFC system.

The present invention relates additionally to a use of a coating material, in particular of a coating material for application to a narrow side of a workpiece, in combination with a coating machine, wherein the coating material is introduced to the coating machine in order to be applied to a workpiece, in particular a workpiece in panel form, wherein a detection device detects a marking of the coating material, whereby first information relating to the coating material and stored on a cloud-based server is provided to the coating machine, in particular is loaded into a control device of the coating machine. Aspects mentioned hereinbefore can be employed within the scope of use.

The present invention relates further to a handling device for a coating material, in particular for applying the coating material to a narrow side of a workpiece. The handling device comprises:

a detection device for detecting a marking of the coating material, wherein the marking serves to identify first information relating to the coating material, a transmitting device for transmitting the marking to a cloud-based server which has stored the first information in relation to the marking of the coating material, a receiving device for receiving the first information relating to the coating material from the cloud-based server, and a control device which controls the handling device on the basis of the received first information.

In particular, the handling device is configured to carry out the method according to any one of the preceding aspects and/or aspects of the claims, wherein features of the subclaims can each also be considered independently of claim 1.

The handling device is preferably a coating machine. The coating machine can comprise a pressing roller for applying the coating material to a workpiece, in particular to a narrow side of the workpiece.

DETAILED DESCRIPTION OF THE PREFERRED EMBODIMENTS

Preferred embodiments of the present invention are described in detail hereinbelow with reference to the accompanying figures. Further modifications of specific features mentioned in this connection can each individually be combined with one another in order to form new embodiments.

Figure 1:
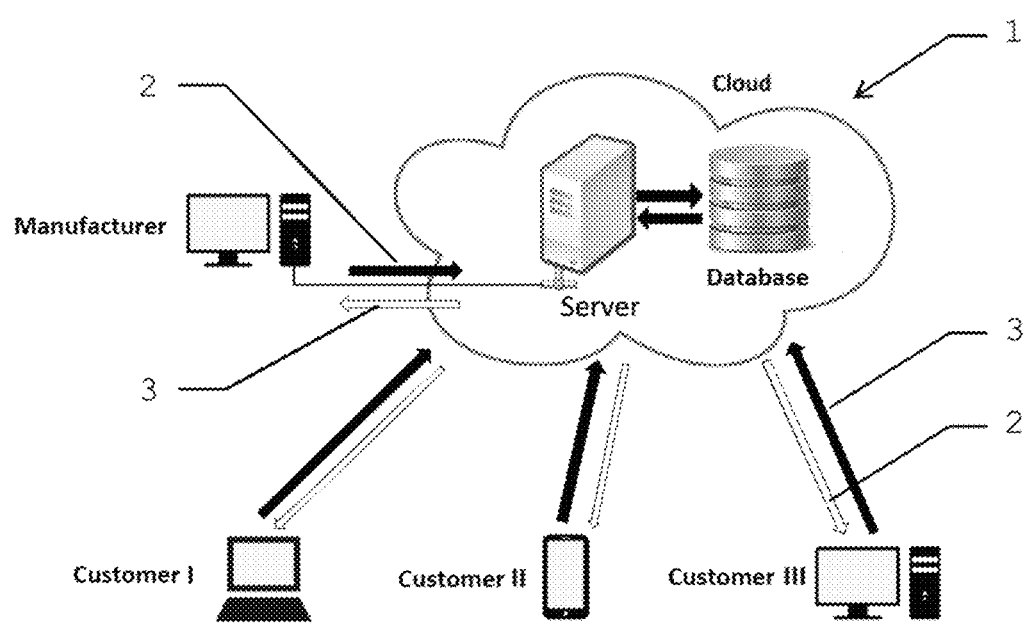
FIG. 1 shows, schematically, the interplay of individual participants in the handling of a coating material according to an embodiment of the method of the present invention.

FIG. 1 shows, schematically, the interplay of individual participants in the handling of a coating material according to one embodiment of the method of the present invention. By way of example, a manufacturer of a coating material is here shown together with three customers, or three processing establishments. As is further apparent from FIG. 1, a cloud-based server 1 constitutes a communication interface between the manufacturer and the customers (I to III). As is illustrated in FIG. 1 by means of a continuous connecting line between a computer of the manufacturer and the cloud-based server 1, only the manufacturer has full access to the server. The manufacturer accordingly acts as the administrator of the server 1 and administers a database on the server 1. To which the customers have access, in particular limited access. The customers can thereby have access to the cloud-based server 1, as illustrated, by means of a control device of a processing device, in particular a coating machine, a desktop computer or by means of a mobile device, such as a tablet, a laptop, a smartphone, etc. As will be described in detail later in relation to FIG. 2, the manufacturer can store in the database of the server 1 first information 2, which relates to a marked coating material, and thus make that information accessible to the customers via the cloud-based server 1. The customers can in turn access that stored first information 2 and themselves store on the server 1 second information 3, which relates to the same coating material or at least to a coating material of the same type. After this second information 3 has been stored on the server by the customers, the manufacturer is in turn able to access that second information 3. For that reason, two arrows are shown between the manufacturer and the server as well as between the individual customers and the server, which arrows illustrate the flow of communication.

Figure 2:
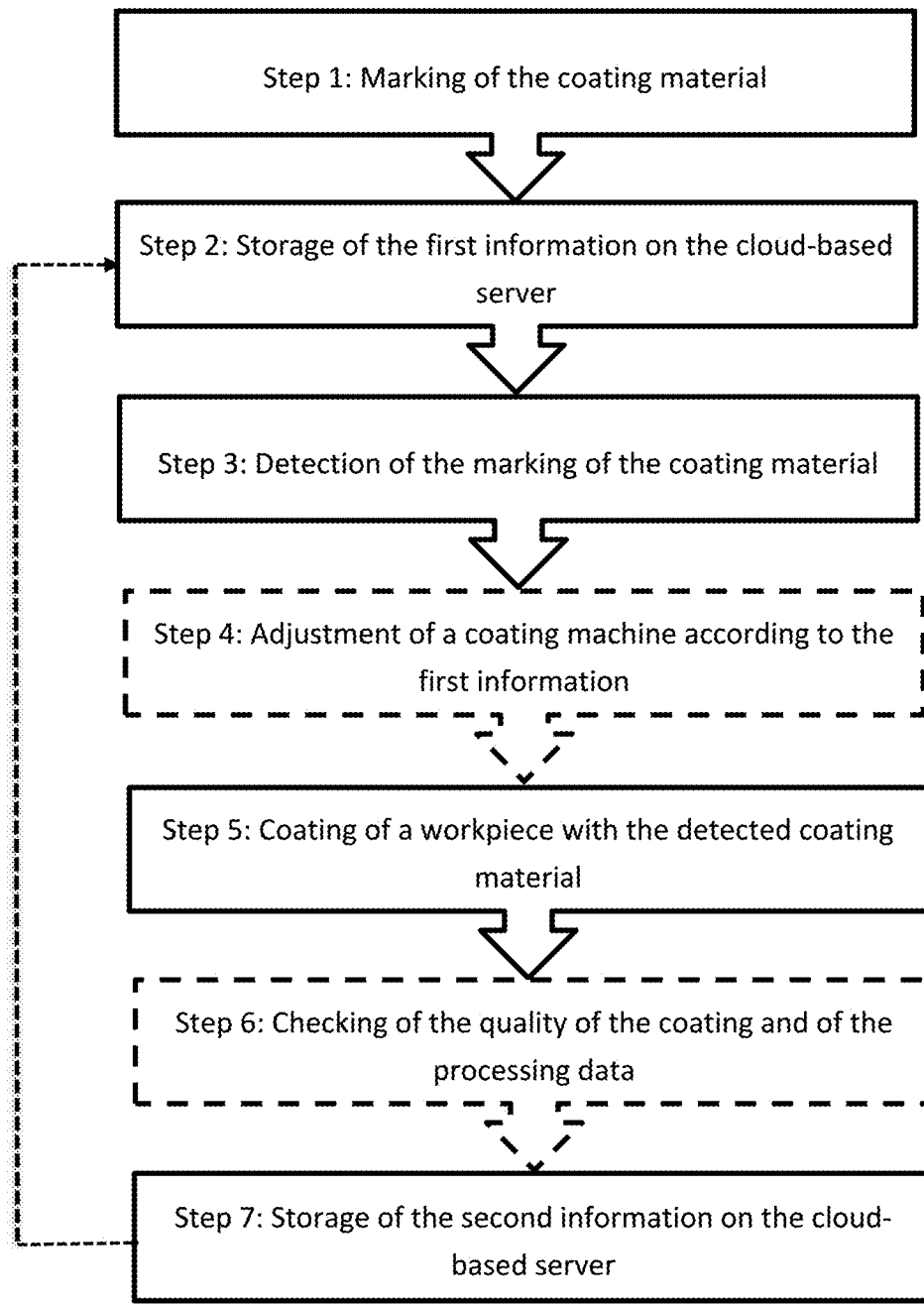
FIG. 2 shows a flow diagram of an embodiment of the method of the present invention.

FIG. 2 shows a flow diagram of an embodiment of the method of the present invention. In this method, in step 1, a marking is applied by a manufacturer to a preferably finished coating material for identifying first information 2 relating to the coating material. The marking can thereby be applied in the form of, for example, a barcode or an RFID tag.

In the second step of the method, the first information 2 relating to the coating material, in particular an item number by which the coating material is clearly identifiable in the database of the cloud-based server 1, as well as processing data relating to the coating material are stored on the cloud-based server 1, in particular under the item number.

The finished coating material is then generally packed and delivered to a customer, or a processing establishment.

If the coating material is required for coating a workpiece, the customer can clearly identify the coating material in question in step 3 by detecting the marking of the coating material. The customer thereby accesses the cloud-based server 1 by means of the item number stored in the marking, in particular in the first information 2, and identifies the coating material. He can thereby access further data of the first information 2 linked with the item number, such as, for example, processing data etc.

Optionally, a step 4 is shown, which is marked as being optional by a broken line. In step 4, on the basis of the first information 2, in particular processing data, provided by the cloud-based server 1, a coating machine can be adjusted, in particular automatically adjusted, according to the requirements of the identified coating material. This is to be understood as meaning that a controller of the coating machine, after detecting the marking and the associated identification of the loaded coating material, automatically acquires the necessary processing data (processing parameters) from the cloud-based server 1 and configures the coating machine accordingly.

Then, according to the present embodiment of the present invention, coating of a workpiece with the detected and identified coating material takes place in step 5, wherein coating preferably takes place fully automatically.

In the following step 6, which again is an optional step, the quality of the coating can be checked. Checking of the quality can thereby be carried out fully automatically by a testing device, such as, for example, by a camera system or the like, or can be performed by an operator by visual testing.

Then, in a final step 7, second information 3 relating to the coating material is stored on the cloud-based server 1. This second information is preferably empirical values or optimised processing data for processing the coating material obtained as a result of the processing of the coating material, as well as the quality assessment optionally determined in step 6.

On the basis of the second information 3 stored on the server 1, in particular if second information 3 has been stored by different customers in respect of a same coating material type, the manufacturer can carry out an evaluation of the accumulated second information 3 and, on the basis thereof, optionally determine optimised manufacturing parameters of the coating material or optimised processing data for the coating material. If optimised processing data can be determined, these can be stored on the cloud-based server 1 as updated first information 2 and can thus be provided to customers for the future processing of the same coating material.

The invention claimed is:

1. A method for handling a coating material for application to a side of a workpiece, the method comprising:
   marking the coating material with a mark identifying first information relating to the coating material;
   storing the first information relating to the coating material on a cloud-based server;
   detecting the mark identifying the first information relating to the coating material, wherein the first information relating to the coating material becomes accessible via the cloud-based server to a processing operator for performing a processing operation on the workpiece using a coating apparatus;
   storing second information relating to the coating material on the cloud-based server after detecting the mark and after initiation of the processing operation, wherein the second information comprises processing data relating to the coating material, the processing data of the second information comprising one or more of: a melting temperature of an adhesive agent, a melting temperature of an adhesive layer of the coating material, a contact pressure, a curing time of the adhesive agent, a curing time of the adhesive layer, or a quality assessment of the coating material;
   after processing the coating material, storing the processing data on the cloud-based server; and
   determining optimized processing data or processing algorithms based on a plurality of second information stored on the cloud-based server;
   wherein each of the plurality of second information comprises a respective processing data associated with a specific coating material or a batch of workpieces, the plurality of second information comprises the stored second information, and the determined optimized processing data or processing algorithms are usable as updated first information or are storable on the cloud-based server as updated first information that is usable in a closed-loop between the processing operator and the cloud-based server.

2. The method of claim 1 wherein:
   marking the coating material occurs during a manufacturing process of the coating material;
   detecting the mark identifying the first information relating to the coating material occurs during processing of the coating material, wherein processing the coating material comprises a process of coating a workpiece with the coating material; and
   detecting the mark identifying the first information relating to the coating material comprises detecting the mark identifying the first information relating to the coating material by a barcode reader, an RFID reader, or an NFC system.

3. The method of claim 1, wherein:
   the first information relating to the coating material comprises one or more selected from the following: an item number, a size, a property, a batch number, a date of manufacture, a use-by date, or processing data of the coating material; and
   the processing data of the coating material for the first information comprises one or more of: a melting temperature of an adhesive agent or a melting temperature of an adhesive layer of the coating material.

4. The method of claim 1, wherein:
   the second information relating to the coating material comprises one or more selected from the following: an item number or the processing data of the coating material.

5. The method of claim 1, wherein after processing the coating material, the processing data is stored on the cloud-based server, wherein storing the processing data occurs in a coating-material-specific manner, and wherein processing the coating material comprises detecting the mark identifying the first information relating to the coating material.

6. The method of claim 1, wherein the first information relating to the coating material and stored on the cloud-based server is updated, and wherein the updated first information comprises one or more of: a melting temperature of an adhesive agent, a melting temperature of an adhesive layer of the coating material, a contact pressure, a curing time of the adhesive agent, or a curing time of the adhesive layer.

7. The method of claim 1, wherein automatic updating of processing data or processing algorithms stored in processing devices occurs based on the determined optimized processing data or processing algorithms.

8. The method of claim 1, wherein based on a plurality of second information stored on the cloud-based server, one or more of the following are determined: quality assessments of a specific coating material, conclusions about manufacturing problems, optimized manufacturing parameters, wear phenomena in a manufacture of the coating material, or wear phenomena in the processing of the coating material.

9. The method of claim 1, wherein a processing device of a coating machine automatically stores the second information on the cloud-based server, and wherein the second information comprises selected processing data.

10. The method of claim 1, wherein the first information and the second information on the cloud-based server are password-protected, the password being stored in the mark identifying the first information relating to the coating material.

11. The method of claim 1, wherein:
a coating machine detects the mark identifying the first information relating to the coating material;
the coating machine determines a type of the coating material being used;
the coating machine comprises a pressing roller for applying the coating material to a workpiece; and
the first information is loaded into a control device of the coating machine after the mark identifying the first information relating to the coating material is detected.

12. The method of claim 11, wherein:
based on the first information, the control device adjusts or activates a tool or a unit of the coating machine for preparing an adhesive layer of the coating material;
the tool or the unit of the coating machine comprises a power of an energy source; and
the power of the energy source comprises a laser, a microwave source, a hot air source, or an infrared source.

13. The method of claim 1, wherein the mark identifying the first information relating to the coating material is embossed, applied, adhesively bonded, introduced or printed.

14. The method of claim 1, wherein the storing comprises, after a series of processing operations using the same type of coating material, storing the processing data on the cloud-based server.

15. A method for handling a coating material for application to a side of a workpiece, the method comprising:
storing first information relating to the coating material or workpiece on a cloud-based server;
providing an identifier mark with the coating material to a processing operator, the identifier mark being associated with the first information to permit the processing operator to access the first information via the cloud-based server when the processing operator initiates a processing operation on the workpiece;
after initiation of the processing operation, automatically storing second information on the cloud-based server that is generated during the processing operation and related to the coating material or the workpiece, the second information comprising one or more of: a melting temperature of an adhesive agent, a melting temperature of an adhesive layer of the coating material, a contact pressure, a curing time of the adhesive agent, a curing time of the adhesive layer, or a quality assessment of the coating material;
based on the second information from one or more processing operations, automatically determining optimized processing data or algorithms for the coating material or the workpiece; and
automatically storing the optimized processing data or algorithms on the cloud-based server, the optimized processing data or algorithms being accessible for subsequent processing operations to form in a closed loop between one or more processing operators and the server to facilitate optimization of process parameters for the processing operation.

16. The method of claim 1, wherein the marking of the coating material is performed during a manufacturing process of the coating material.

17. The method of claim 1, wherein the detecting the mark takes place during the processing operation of the coating apparatus.

18. The method of claim 1, wherein the storing second information is performed automatically, and the second information is generated during the processing operation.

19. The method of claim 1, wherein the updated first information is usable in a closed-loop between the processing operator and the cloud-based server for subsequent processing operations to automatically adjust one or more parameters of the coating apparatus based on the coating material or workpiece used in the subsequent processing operations.

* * * * *